United States Patent
Siegl

(10) Patent No.: US 11,642,814 B2
(45) Date of Patent: May 9, 2023

(54) RECYCLED PET BARRIER BOTTLE

(71) Applicant: ALPLA WERKE ALWIN LEHNER GMBH & CO. KG, Hard (AT)

(72) Inventor: Robert Siegl, Dornbirn (AT)

(73) Assignee: ALPLA WERKE ALWIN LEHNER GMBH & CO. KG, Hard (AT)

( * ) Notice: Subject to any disclaimer, the term of this patent is extended or adjusted under 35 U.S.C. 154(b) by 284 days.

(21) Appl. No.: 16/619,420

(22) PCT Filed: Jun. 8, 2018

(86) PCT No.: PCT/EP2018/065174
§ 371 (c)(1),
(2) Date: Dec. 4, 2019

(87) PCT Pub. No.: WO2018/224652
PCT Pub. Date: Dec. 13, 2018

(65) Prior Publication Data
US 2020/0171709 A1 Jun. 4, 2020

(30) Foreign Application Priority Data
Jun. 8, 2017 (CH) .................................... 00739/17

(51) Int. Cl.
| | | |
|---|---|---|
| B29B 11/14 | (2006.01) | |
| B29C 49/00 | (2006.01) | |
| B29C 49/06 | (2006.01) | |
| B29C 49/08 | (2006.01) | |
| B65D 1/02 | (2006.01) | |
| C08K 5/15 | (2006.01) | |
| B29B 11/08 | (2006.01) | |
| C08K 5/1535 | (2006.01) | |
| B29K 67/00 | (2006.01) | |
| B29L 31/00 | (2006.01) | |
| B29K 105/26 | (2006.01) | |

(52) U.S. Cl.
CPC .............. B29B 11/08 (2013.01); B29B 11/14 (2013.01); B29C 49/0005 (2013.01); B29C 49/06 (2013.01); B29C 49/08 (2013.01); B65D 1/0207 (2013.01); C08K 5/1535 (2013.01); *B29C 2949/0817* (2022.05); *B29K 2067/003* (2013.01); *B29K 2105/26* (2013.01); *B29L 2031/7158* (2013.01)

(58) Field of Classification Search
CPC ......... B29B 11/08; B29B 11/06; B29B 11/14; B29C 49/0005; B29C 49/06; B29C 49/08; B65D 1/0207; B65D 1/0261; B65D 1/0223; B65D 35/285; B65D 35/28; B65D 35/24; B65D 1/40

USPC .................. 215/371, 370; 220/604, DIG. 11, 220/DIG. 14, 675, 671, 670, 669; 264/921, 911, 478, 645, 241; 222/95, 92
See application file for complete search history.

(56) References Cited

U.S. PATENT DOCUMENTS

| | | | | |
|---|---|---|---|---|
| 4,954,376 | A | * | 9/1990 | Krishnakumar .... B29C 45/1643 215/12.1 |
| 6,039,204 | A | * | 3/2000 | Hosokoshiyama .. B65D 1/0215 220/623 |
| 2011/0120902 | A1 | | 5/2011 | Boswell |
| 2013/0270212 | A1 | | 10/2013 | Collias et al. |
| 2015/0064383 | A1 | | 3/2015 | Kriegel |
| 2015/0110983 | A1 | | 4/2015 | Kriegel |
| 2015/0141584 | A1 | | 5/2015 | Saywell et al. |
| 2015/0191269 | A1 | | 7/2015 | Siegl |
| 2017/0136747 | A1 | * | 5/2017 | Torradas ............... B32B 29/002 |

FOREIGN PATENT DOCUMENTS

| | | |
|---|---|---|
| EP | 2763908 A2 | 8/2014 |
| WO | 2006124200 A1 | 11/2006 |
| WO | 2013062408 A1 | 5/2013 |
| WO | 2013097013 A1 | 7/2013 |
| WO | 2013149221 A1 | 10/2013 |
| WO | 2013182541 A1 | 12/2013 |
| WO | 2014032731 A1 | 3/2014 |
| WO | 2014037094 A1 | 3/2014 |

(Continued)

OTHER PUBLICATIONS

Gerald Michael, "PEF Recycling," dated Jun. 28, 2018, retrieved from https://www.synvina.com/wp-content/uploads/2017/06/Synvina_recycling_June 2017.pdf, retrieved Jul. 17, 2018.

(Continued)

*Primary Examiner* — Robert J Hicks
(74) *Attorney, Agent, or Firm* — Morriss O'Bryant Compagni Cannon, PLC

(57) ABSTRACT

The invention relates to a preform for producing a plastic container in a blow moulding method, comprising an elongated, preform body, which is formed so as to be closed at the one longitudinal end thereof and, at the other longitudinal end thereof, has a neck section having a pouring opening. The preform is produced from recycled PET and aliphatic furanoate, wherein the recycled PET has a maximum of 2.5 wt % of isophthalic acid and diethylene glycol, wherein the proportion of isophthalic acid is no higher than 2.0 wt %, and the proportion of diethylene glycol is no higher than 2.0 wt %, wherein all the percentages by weight are based on the total weight of the preform. Turbidity of the preform, measured in accordance with ASTM D I 003-00, is less than 5%, as a result of the admixture of the aliphatic furanoate.

17 Claims, No Drawings

(56) References Cited

FOREIGN PATENT DOCUMENTS

| | | | |
|---|---|---|---|
| WO | 2013158582 A3 | 5/2014 |
| WO | 2014204313 A1 | 12/2014 |
| WO | 2015015243 A1 | 2/2015 |
| WO | 2015031907 A1 | 3/2015 |
| WO | 2015168563 A1 | 11/2015 |
| WO | 2016019361 A1 | 2/2016 |
| WO | 2016124403 A1 | 8/2016 |
| WO | 2016130748 A1 | 8/2016 |
| WO | 2016200653 A1 | 12/2016 |
| WO | 2018224652 A1 | 12/2019 |

OTHER PUBLICATIONS

De Jong et al., "Furandicarboxylic Acid (FDCA), A Versatile Building Block for a Very Interesting Class of Polyesters," Jan. 1, 2012, Biobased Monomers, Polymers, and Materials; [ACS Symposium Series], American Chemical Society, Washington, DC, pp. 1-13, retrieved from the Internet: http://www.researchgate.net/publication/234111253_Furandicarboxylic_acid_(FDCA)_aversatile_building_block_for_a_very_interesting_class_of_polyesters/ retrieved Aug. 16, 2012.

PCT International Search Report for PCT/EP2018/065174 dated Jul. 30, 2018.

Van Aken, Tom, 100% biobased PEF bottles: The Solution for the missing building blocks, Avantium, Bioplastek Forum, New York, Jun. 27, 2011, pp. 1-20.

Schotland Business Research, Inc., "BioPlastek 2011 Forum: Will Avantium's "PEF" Bottles Meet the Needs of Brand Owners?" Mar. 30, 2011.

Declaration of Jeff Wooster DOW Global (on behalf of E.I. du Pont de Nemours and Company) from EPO register file DuPont opposition, Jan. 10, 2019.

Annex 3 to the Declaration of Jeff Wooster DOW Global (on behalf of E.L du Pont de Nemours and Company) from EPO register file DuPont opposition, Jan. 10, 2019.

Dunne, Paul of Mewburn Ellis LLP, Written submissions by duPont in opposition against the Evian patent EP2890544, Jan. 11, 2019, pp. 1-28.

Van Aken, Tom, Twitter statements by Tom van Aken, CEO of Avantium, Jun. 2011, Amsterdam, the Netherlands.

Sherman, Lilli Manolis, New Conference Explores Bioplastics in Packaging & Durables, Plastics Technology, Gardner Business Media Inc., Cincinnati, Ohio, Sep. 29, 2011, pp. 1-5.

McEvoy, J.P et al., Simulation of the Stretch Blow Molding Process of PET Bottles, Advances in Polymer Technology, vol. 17, Issue 4, pp. 339-352 Jan. 22, 1998, Available from: [https://onlinelibrary.wiley.com/doi/ftr/10.1002/%28SICI%291098-2329%28199824%2917%3A4%3C339%3A%3AAID-ADV5%3E3.0.CO%3B2-S].

Mangnus, Peter, Latest Advancements in Biobased Materials and Partnerships, Avantium, Bio-Plastics Conference, San Francisco, California, Jun. 2012, pp. 1-22.

Gotro Jeffrey, Polyethylene Furanoate (PEF): 100% Biobased Polymer to Compete with PET?, Polymer Innovation Blog, https://polymerinnovationblog.com, Apr. 8, 2013.

Brandau Ottmar, Stretch Blow Molding, PDL handbook series, Plastics Design Library, 2012, pp. 207-256, 271-287, Published by William Andrew.

Brandau, Ottmar, Stretch Blow Molding, PDL handbook series, Plastics Design Library, 2012, pp. 1-25, 47-65, 67-71, 195-206, Published by William Andrew.

Nieuwsuur, Avantium's Revolutionary Plastic, broadcast on the Dutch national television programme "Nieuwsuur", Dec. 15, 2011, Available at [https://www.youtube.com/watch?v=O4l3noNaXIE].

De Jong, E., et al., Furandicarboxylic Acid (FDCA), A Versatile Building Block for a Very Interesting Class of Polyesters, in Chapter 1—Biobased Monomers, Polymers, and Materials, In Biobased Monomers, Polymers, and Materials, 2012, American Chemical Society.

Sousa, AF et al., New copolyesters derived from terephthalic and 2,5-furandicarboxylic acids: a step forward in the development of biobased polyesters; Polymer, vol. 54, Issue 2, 2013.

International Preliminary Report on Patentability, International Application No. PCT/US2016/035246, dated Dec. 12, 2017, 7 pages.

Dunne, Paul of Mewburn Ellis, Statement of Grounds in opposition by DuPont against Evian patent EP2890544, Aug. 30, 2017, 23 pages.

Mangnus, Peter, The worid's next-generation polyester 100% biobased polyethylene furanoate (PEF), Bioplastics Magazine, vol. 7, Aug. 6, 2012.

De Jong, Ed, YXY building blocks: biorefinery approach towards fuels and plastic applications, presentation at IEA Bioenergy Task 42, Italian Stakeholders Workshop, Apr. 4, 2011, Tortona, Italy.

Roerink, F, Avantium presentation delivered at Cleantech Forum Amsterdam, May 2011.

Rheinshagen, Paul, Why PEF is better than PET, Bio Based Press, Amsterdam, Jul. 1, 2012.

Pierce, Lisa, PEF will not oust PET for beverage bottles anytime soon, Packaging Digest, Jul. 28, 2014, pp. 1-4, www.packagingdigest.com.

De Jong, E., et al., Furandicarboxylic Acid (FDCA), A Versatile Building Block for a Very Interesting Class of Polyesters, in Chapter 1—Biobased Monomers, Polymers, and Materials, In Biobased Monomers, Polymers, and Materials, 2012, ACS Symposium, American Chemical Society, Washington, DC.

Roerink, Frank, Avantium's YXY: Green Materials and Fuels, presentation at The 2nd Annual Biobased Chemicals Summit, Feb. 15, 2011.

European PET Bottle Platform, How to keep a sustainable PET recycling industry in Europe, https://www.epbp.org/.

U.S. Appl. No. 62/174,395, filed Jun. 11, 2015, Enhanced Barrier Performance Via Blends of Poly (Ethylene Furandicarboxylate) and Poly(Ethylene Terephthalate).

Experimental Report, cited in opposition of EP3307515, Jan. 2023.

Burgess, Steven K, Fundamentals of Transport in Poly(Ethylene Terephthalate) and Poly(Ethylene Furanoate) Barrier Materials, Dissertation at Georgia Institute of Technology, 2015, 479 pages.

Screenshot from the Georgia Tech website about dissertation of Burgess, Steven K, Fundamentals of Transport in Poly(Ethylene Terephthalate) and Poly(Ethylene Furanoate) Barrier Materials, Dissertation at Georgia Institute of Technology, 2015.

* cited by examiner ured during processing and thus the b value increases. The a value is a measure of the red-green discoloration of the PET. In addition to the yellowing of the reclaim, a green discoloration of the reclaim usually also occurs, which is compensated with red color, and in the color compensation also turns the reclaim darker, if by the additive color mixture the green tinge is to be suppressed.

RECYCLED PET BARRIER BOTTLE

CROSS-REFERENCE TO RELATED APPLICATIONS

This application is a national phase entry under 35 U.S.C. § 371 of PCT/EP2018/065174 filed Jun. 8, 2018, which claims priority to Swiss Patent Application No. 00739/17 filed Jun. 8, 2017, the entirety of each of which is incorporated by this reference.

FIELD OF THE INVENTION

The invention relates to a PET barrier bottle, a method for producing a PET barrier bottle and a reclaim.

BACKGROUND ART

Plastic bottles, which are mainly made of polyethylene terephthalate (short PET), are to be supplied to a large part of the recycling stream and thereby processed again and again.

One of the problems with repeated recycling is the progressive yellowing, clouding and graying of the PET. With each further cycle of recycling, the PET becomes more yellowish, cloudier and grayer. The addition of blue color compensates for the yellowish tinge. In this color compensation, however, the PET becomes darker and grayer. A continuously yellow and/or darker PET with continuous recycling stages can no longer meet the optical requirements of high-quality packaging.

Another problem that arises with ongoing recycling is the increasing number of debris in the reclaim (glass shards, foreign polymers, paper, wood, etc.) that increases with each additional cycle. Such foreign bodies either cloud the PET themselves or act as crystallization seeds, causing the PET to crystallize locally, wherein the clouding is amplified by the additional crystalline structure.

The color in PET is determined by the three parameters L, a and b. The parameters are represented as L, a, b or often also as L*a*b*. The L*a*b*-color space (also: Lab colors, CIELAB, CIEL*a*b*) describes all perceivable colors. The most important properties of the L*a*b* color model include device independence and perceptuality, that is: Irrespective of the nature of their production or rendering technique, colors are defined as perceived by a standard observer in a standard lighting condition. The color model is standardized in the EN ISO 11664-4 "Colorimetry—Part 4: CIE 1976 L*a*b* Colour space".

The parameter L is a measure of the darkness of the PET. The higher the L value, the lighter the PET. PET with values of L<65 are very dark and rather gray, whereas PET with values of L>85 is light. Newly produced PET without recycling parts (so-called virgin PET) can easily be produced with an L value above 85, for example L=89. Gray virgin PET also exists, with L values below 85 containing coal dust, IR absorbers or other additives that cloud the virgin PET. However, these types are avoided if they are to be mixed in combination with already heavily clouded PET or dark PET.

The b value is a measure of the yellow-blue discoloration of the PET. For example, a yellowed PET has a b value greater than 5 (b>5), which can reach values of b>20 for heavily yellowed PET. A negative b value describes the measure of the blue color of the PET. Virgin PET has b values between −3 and 0. The blue tinge is produced via additives, for example cobalt compounds. Virgin PET is adjusted to a blue tinge, as it inevitably turns more yellow during processing and thus the b value increases. The a value is a measure of the red-green discoloration of the PET. In addition to the yellowing of the reclaim, a green discoloration of the reclaim usually also occurs, which is compensated with red color, and in the color compensation also turns the reclaim darker, if by the additive color mixture the green tinge is to be suppressed.

In every recycling process that the PET goes through, the L value decreases, whereas the b value and the a value increase. The PET not only becomes more yellowish during the recycling runs, but the yellow tinge is also amplified by contaminants that contaminate the PET during a recycling cycle.

In order to keep the quality of the recycling flows acceptable, PET materials, which would lead to a strong yellowing of the recycling flows, have to be filtered out or are not even allowed to reach the recycling flows.

PET bottles may contain polyamide in layers or admixed to have a barrier with respect to oxygen and carbon dioxide. Such polyamide-stained PET bottles have a particularly negative effect on the yellow tinge of the reclaim, since polyamide yellows much more rapidly than PET with increasing time and temperature. In addition, the polyamide in the PET reclaim forms small polyamide domains which scatter the light and additionally cloud the PET reclaim. It is therefore attempted not to involve PET bottles laced with polyamide in the recycling flow. Such bottles can be identified by a so-called roasting test. For the roasting test, the PET bottle is heated in an oven for about 60 minutes at 220° C. PET bottles without polyamide hardly turn more yellow in the roasting test, whereas PET bottles with polyamide turn very yellow and darken. The PET bottles laced with polyamide reach b values of up to 20 in the roasting test.

In addition, the yellowing of PET bottles during recycling is amplified when catalysts are present in the PET bottle that catalyze supporting oxidation. The catalysts used here are mainly cobalt salts. The oxidation of the packaging material leads to a protection of the contents from oxidation, since the oxygen reacts with the packaging before it can react with the contents.

Accordingly, there is a need for PET barrier bottles which are not too yellowish, dark or cloudy or reclaim therefrom which is not too yellowish, too dark or too cloudy.

ADVANTAGES OF THE INVENTION

From the disadvantages of the described prior art, the advantages of the present invention result in the production of a generic PET barrier bottle that is less heavily yellowed, darkened or cloudy during the recycling cycles and at the same time has a barrier with respect to oxygen and carbon dioxide. Therefore, PET bottles with a barrier with respect to oxygen or carbon dioxide shall be proposed which, despite the barrier and an existing proportion of recycled PET, are suitable for further recycling and have significantly better optical properties than the prior art.

SUMMARY

For the purposes of this patent application, PET bottles are PET bottles that increase either the carbon dioxide or oxygen barrier by at least 10% compared to regular PET or increase both values by more than 10%.

A solution is achieved in that the PET bottle contains an aliphatic furanoate, for example polymethylene furanoate, polyethylene furanoate (PEF), polypropylene furanoate, polybutylene furanoate or polypenthylene furanoate, or several different aliphatic furanoates. Therefore, the additives customary for PET barrier bottles for the production of the barrier, namely polyamide and/or cobalt catalysts, are exchanged with so-called aliphatic furanoates (A furanoates). The use of PEF is desired thereby.

The barrier bottles do not form domains which scatter the light by the addition of aliphatic furanoates, but surprisingly form copolymers with the PET. These copolymers crystallize significantly slower than normal PET homopolymer, or conventional copolymers containing 1 to 6% of isophthalic acid or 1 to 3% of diethylene glycol, and clearly prevent the additional clouding of PET reclaim bottles through PET crystals (so-called spherolites), which inevitably crystallize at the contamination in the PET reclaim. The aliphatic furanoates yellow significantly less during processing and the final bottle is either less yellowish or, if color compensation is carried out with red and blue, the final bottle is less dark (gray).

In a particular embodiment of the invention, the PET bottle contains more than 30 wt %, more than 40 wt % or more than 50 wt % of recycled PET. Although the PET barrier bottle may contain more than 50 wt % of recycled PET, the PET bottle has a b value that is less than 5 and an L value that is greater than 76. The addition of the aliphatic furanoates makes it possible to produce PET barrier bottles that have acceptable b and L values even though they contain recycled PET material and an improved barrier with respect to oxygen and carbon dioxide compared to PET bottles without further additives. This is in contrast to prior art PET barrier bottles, which have an unacceptable yellow tinge and an unacceptable darkness due to recycling. To measure the values of the CIELAB color space, a sample is taken from the bottle body of an empty bottle. The sampling point of the sample is determined as follows. First, on the peripheral surface of the bottle body, the points are determined on which the empty bottle is balanced when it is placed. These points result in a circumferential line on the bottle body. The sample is taken from the point where the bottle body has the least curvature. In addition, the center of gravity of the sample taken is approximately on said line.

In a further embodiment of the invention, the PET bottle contains between 4 wt % and 40 wt % of an aliphatic furanoate or contains several different aliphatic furanoates, the sum of which is between 4 wt % and 40 wt %. With these amounts of aliphatic furanoates, PET bottles are obtained which increase the barrier of the PET with respect to carbon dioxide and oxygen and still have b values of less than 5 after processing and recycling.

The PET bottle may contain less than 2 wt % of isophthalic acid. The amount of isophthalic acid which acts as a crystallization inhibitor can be reduced with the addition of aliphatic furanoates, since the aliphatic furanoates also limit crystal growth and result in a PET bottle with an acceptable clouding which would otherwise only be achieved with an addition of isophthalic acid of up to 6 wt %.

It proves useful if the PET bottle contains non-recycled PET. By adding a proportion of non-recycled PET or virgin PET, the PET barrier bottle can be adapted to very high requirements with respect to a low yellow tinge and low clouding and can nevertheless be recycled.

It proves to be advantageous if the PET bottle contains less than 1 wt % of polyamide and less than 1 wt % of cobalt salts. These small proportions of polyamide and cobalt salts lead to a low yellowing of the PET bottle. The low proportions of polyamide and cobalt salt can usually not be avoided because they pass through the reclaim into the mixture for producing the PET bottle.

In a further embodiment of the invention, the PET bottle contains aliphatic furanoates produced from raw materials of biological origin. The production from natural raw materials, for example plant starch, leads to furanoates which can be produced independently of crude oil derivatives. The aliphatic furanoates are 100% bio-based and additionally improve the ecological assessment (CO2 balance) of the packaging.

In a further embodiment of the invention, the PET bottle has a 10% improved barrier with respect to oxygen and/or carbon dioxide compared to a PET bottle which contains exclusively PET. The improved barrier properties with simultaneous recyclability are due to the use of aliphatic furanoates instead of polyamide. Despite its good barrier properties, the PET barrier bottle can be recycled without bringing a massive increase in yellowness and clouding to the recycling flow.

In a further embodiment of the invention, the PET bottle has a wall thickness such that it is suitable for refilling or as a reusable bottle. For this, the preform must have a wall thickness between 3 mm and 10 mm for stretch blowing the PET bottle, so that the PET bottle has a sufficiently thick wall thickness. The presence of an aliphatic furanoate between 4% by weight and 40% by weight inhibits the formation of crystallization in the preform. The required wall thickness can therefore be realized without the blowability of the preform being decreased by the crystallization or being clouded too much by the crystallization.

Another aspect of the invention relates to a method of producing a PET barrier bottle as described in the preceding paragraphs. By means of the mixture of plastic granules containing recycled PET granules and granules of an aliphatic furanoate, a PET bottle can be produced which contains recycled PET and has an improved barrier with respect to carbon dioxide and oxygen and still has L and b values, which are acceptable for most applications.

If the barrier would be made by the addition of polyamide, the L and b values of such a bottle would be unacceptable and the bottle would have to be discarded. The PET barrier bottle produced by the process can be supplied to the recycling flow because it has L and b values that meet the limits to be processed in the recycling flow.

In a further embodiment of the invention, the temperature during the injection molding of the preform is at least 270° C. and at most 300° C. or at least 270° C. and at most 275° C. In this temperature range, a sufficient degree of copolymerization and a low yellowing is ensured.

In a further embodiment of the invention, the dwell time of the mixture of plastic granules in the injection molding machine is at least 30 seconds and at most 300 seconds. In this dwell time range, a sufficient degree of copolymerization and a low yellowing is ensured. A processing time which is too long or a processing temperature which is too high causes the mixture to yellow too much. In contrast, a processing temperature and a dwell time which are too low have a positive effect on the prevention of yellowing, but the copolymerization does not take place at a working temperature which is too low and a dwell time which is too short.

The mixture of plastic granules may be dried at more than 155° C. prior to injection molding. The plastic granules are preheated thereby, whereby the dwell time is shortened in the extrusion screw. As a result, the shear forces and mechanical degradation in the extrusion screw are kept as low as possible.

The mixture of plastic granules may also be laced with phosphoric acid. Phosphoric acid acts as a stabilizer, whereby the degradation of the material and its yellowing associated with degradation is kept as low as possible.

In a further embodiment of the invention, a preform for producing a plastic container in a blow molding process is proposed, which has an elongated, tube-like preform body, which is formed so as to be closed at the one longitudinal end thereof, and, at the other end thereof, has a neck section having a pouring opening. The preform is made from recycled PET and aliphatic furanoate, with the recycle PET having a maximum of 2.5 percent by weight of a mixture of isophthalic acid and diethylene glycol, with a maximum of 2.0 percent by weight of isophthalic acid and a maximum of 2.0 percent by weight of diethylene glycol, wherein all weight percentages are based on the total weight of the preform.

A clouding of the preform measured according to ASTM D 1003-00 is less than 5% by admixture of the aliphatic furanoate. The furanoate may be, for example, polymethylene furanoate, polyethylene furanoate (PEF), polypropylene furanoate, polybutylene furanoate or polyphenylene furanoate, or a mixture of different aliphatic furanoates. No isophthalic acid is added to the mixture of recycled PET and aliphatic furanoate. However, isophthalic acid is contained in the recycled PET, which, however, is not specifically withdrawn from the recycled PET. The aliphatic furanoate is admixed with the recycled PET in such a proportion that it prevents crystallization during cooling, so that crystallization cannot be detected in the preform body. Thus, the isophthalic acid may also be at most only 1% and the diethylene glycol at most 1.0%, so that the recycled PET has a maximum of 1.5 percent by weight of a mixture of isophthalic acid and diethylene glycol. The preform can be injection molded or also be extruded.

In a further embodiment of the invention, the preform body has a wall thickness of more than 3 mm and less than 10 mm. The preform contains between 4 wt % and 40 wt % of an aliphatic furanoate, the aliphatic furanoate suppresses the formation of crystallization in the preform. From the preform, PET barrier bottles can be produced by means of a blowing process possibly using a stretching rod with an increased wall thickness, which can be used as refill bottles or as reusable bottles. The PET barrier bottle produced from the preform has less than 5% clouding (clouding) measured according to ASTM D 1003-00.

According to a further embodiment of the invention, a method for producing a preform is proposed, in which a mixture of plastic granules is provided and a preform is produced by injection molding of the mixture. The mixture of plastic granules consists of recycled PET and an aliphatic furanoate, wherein the recycled PET has a maximum of 2.5 percent by weight of a mixture of isophthalic acid and diethylene glycol, wherein the content of isophthalic acid is 2.0 percent by weight and the proportion of diethylene glycol is 2.0 percent by weight or less, wherein all percentages by weight are based on the total weight of the preform. A clouding of the preform is less than 5% measured according to ASTM D 1003-00 by admixture of the aliphatic furanoate.

A further aspect of the invention relates to a reclaim containing PET and aliphatic furanoates. These reclaims can originate from PET barrier bottles, which do not additionally cloud the recycling flow since they have a much lower yellowing than PET barrier bottles with polyamide.

Advantageously, the reclaim is at least partially produced from PET barrier bottles as described above. These PET barrier bottles are approved for recycling and are not filtered out of the recycling flow as they do not additionally cloud the recycling flow.

Conveniently, the reclaim contains non-recycled aliphatic furanoates. These newly produced (virgin) aliphatic furanoates can supplement the reclaim to improve the barrier properties.

According to a further embodiment of the invention, a mixture of recycled PET and aliphatic furanoate is proposed. The recycled PET has a maximum of 2.5 percent by weight of a mixture of isophthalic acid and diethylene glycol. The proportion of isophthalic acid is at most 2.0 percent by weight and the proportion of diethylene glycol is at most 2.0 percent by weight, wherein all percentages by weight are based on the total weight of the preform. Since, as already stated, the proportions of isophthalic acid and of diethylene glycol originate from recycled PET and are not added separately, the proportions for isophthalic acid and diethylene glycol can each be 1.0 percent by weight, wherein the recycled PET contains a maximum of 1.5 percent by weight of a mixture of isophthalic acid and diethylene glycol. The term "mixture" is also referred to as "reclaim" in the context of the present disclosure. The terms "blend" and "mixture" are also common in many cases.

According to a further embodiment of the invention, the proportion of the aliphatic furanoate in the mixture is between 4 percent by weight and 40 percent by weight, based on the total weight of the mixture.

In another embodiment, a PET barrier bottle contains recycled PET with an aliphatic furanoate, for example polymethylene furanoate, polyethylene furanoate (PEF), polypropylene furanoate, polybutylene furanoate or polypenthylene furanoate, or several different aliphatic furanoates.

In another embodiment, the PET barrier bottle may contain more than 30 wt %, more than 40 wt % or more than 50 wt % of recycled PET.

In another embodiment, the PET barrier bottle contains between 4 wt % and 40 wt % of an aliphatic furanoate or contains several different aliphatic furanoates, wherein their sum is between 4 wt % and 40 wt %.

In another embodiment, the PET barrier bottle contains less than 2 wt % of isophthalic acid.

In another embodiment, the PET barrier bottle contains non-recycled PET.

In another embodiment, the PET barrier bottle contains less than 1 wt % of polyamide and less than 1 wt % of cobalt salts.

In another embodiment, the PET barrier bottle contains aliphatic furanoates produced from raw materials of biological origin.

In another embodiment, the PET barrier bottle, compared to a PET bottle, which contains only PET, has a 10% improved barrier with respect to oxygen and/or carbon dioxide.

In another embodiment, the PET barrier bottle has such a wall thickness that it is suitable for refilling or as a reusable bottle.

In another embodiment, a method for producing a PET barrier bottle comprises:
  a mixture of plastic granules is provided,
  a preform is made by injection molding the mixture, and
  the PET barrier bottle is produced by stretch blow molding from the preform,
  the mixture of plastic granules contains recycled PET granules and granules of an aliphatic furanoate.

In another embodiment, the temperature during the injection molding of the preform is at least 270° C. and at most 300° C., or at least 270° C. and at most 275° C.

In another embodiment, the dwell time of the mixture of plastic granules in the injection molding machine is at least 30 seconds and at most 300 seconds.

In another embodiment, the mixture of plastic granules is dried at more than 155° C. prior to injection molding.

In another embodiment, the mixture of plastic granules is laced with phosphoric acid.

In another embodiment, the preform has a wall thickness of more than 3 mm and less than 10 mm.

In another embodiment, a reclaim contains PET and aliphatic furanoates.

In another embodiment, the reclaim is at least partially produced of PET barrier bottles.

In another embodiment, the reclaim contains non-recycled aliphatic furanoates.

It is clear to a person skilled in the art that, where appropriate, features of the PET barrier bottle can also be features of the methods, and vice versa.

Further advantages and features will become apparent from the following description of an embodiment of the invention.

DETAILED DESCRIPTION

The invention relates to a PET barrier bottle, which is produced of at least 50 wt % PET reclaim or recycled PET. For the purpose of this application, PET reclaim is understood to mean a PET raw material which is produced from PET bottles that have already been used. The PET reclaim may be available as granules or as chips obtained by comminuting the bottles. The PET reclaim originates at 100% from already used PET, in particular PET bottles. Newly produced PET, so-called virgin PET, is not present in the PET reclaim.

The more often the PET reclaim is fed into the recycle cycle, the more yellow it turns, turns green and darkens and becomes cloudy. On the one hand, this is due to contaminants, which inevitably accumulate in the PET reclaim. The contaminants may be glass splinters, other polymers, grains of sand, etc. The contaminations themselves and as crystallization seeds for the crystallization of the PET lead to clouding and to a yellow tinge and a green tinge of the PET reclaim.

In addition, the PET reclaim becomes more yellow and green with every further processing.

If the PET bottle contains an addition of polyamide, the polyamide leads to an improved barrier of the PET bottle with respect to oxygen and carbon dioxide. However, the polyamide clearly yellows more heavily than the PET. Therefore, PET bottles containing polyamides are sorted out prior or during recycling, for example by optical sensors (control systems), which, e.g., identify the spectra of the bottles or flakes by laser or infrared or discard yellowish or cloudy bottles or flakes.

The PET barrier bottle has a barrier with respect to oxygen at a fill volume of 500 ml, which is defined in that the oxygen increase into the interior of the bottle is 1 ppm of oxygen within 11 days. The PET barrier bottle has a barrier with respect to carbon dioxide at a fill volume of 500 ml, which is defined in that, within 11 weeks, 20 wt % of carbon dioxide escapes from the interior of the bottle. The aliphatic furanoates effect that the carbon dioxide and/or the oxygen barrier is increased by at least 10% compared to regular PET. In the exemplary embodiment, in a comparable PET bottle with a fill volume of 500 ml, which contains exclusively PET, an increase in oxygen inside the bottle of 1 ppm oxygen occurs within 10 days. In the exemplary embodiment, with a comparable PET bottle with a fill volume of 500 ml, which contains exclusively PET, a carbon dioxide decrease in the interior of the bottle of 20 wt % of carbon dioxide correspondingly results within 10 weeks.

The roasting test is used to identify special bottles that are particularly damaging to the recycling flow due to yellowing and clouding. The results of the roasting test are used to teach and set the optical separation sensors specifically for these bottles.

The added polyamide also causes clouding of the PET bottle as this forms small polyamide domains in the PET matrix, at which the light is scattered.

In addition, catalysts (for example cobalt salts) may be present in the PET bottles, which bring the polyamide but also the PET to oxidation. As a result, the product is protected from the reaction with atmospheric oxygen, since it reacts with the packaging. However, this oxidation reaction also leads to a yellowing of the PET bottle or PET packaging.

In all examples, the yellowing of the PET is due to oxidative and thermal degradation reactions of the PET itself, additives therein or reclaims therein. Accordingly, any processing of the PET in an injection molding machine or a recycling extruder leads to a further yellowing.

Surprisingly, PET recycle can be combined with aliphatic furanoates. After mixing the granule or the PET recycle grinders with the furanoate granule, they form a copolymerization during melting during the injection molding process. The copolymerization also causes the clouding to be reduced because the copolymerization counteracts crystal formation and, in contrast to polyamide, aliphatic furanoates do not form domains in the PET matrix but react with the PET matrix.

A person skilled in the art would not consider a combination of PET recyclate with aliphatic furanoates, since aliphatic furanoates often turn yellow or form domains in the PET themselves during processing and would regard the aliphatic furanoates as contamination.

This not without good reason, since a processing time which is too long or a processing temperature which is too high causes the mixture of the reclaim and the aliphatic furanoates to yellow too much. However, with a longer processing time or an increased processing temperature, copolymerization and transparency are improved. In contrast, a processing temperature and a dwell time which are too low have a positive effect on the prevention of yellowing, but the copolymerization does not take place at a working temperature which is too low.

Temperatures of 270 to 300° C. and dwell times of 30 to 300 seconds in the preform injection molding machine have proven to achieve a sufficient degree of copolymerization and low yellowing.

In addition to the polyethylene furanoate, other aliphatic furanoates can also be used in the mixture with PET recyclate. This may be, for example, polymethylene furanoate, polypropylene furanoate, polybutadiene furanoate or polyphenylene furanoate, or a mixture of several different aliphatic furanoates.

The PET bottles produced with the mixture of PET recyclate and aliphatic furanoates have similarly good barrier properties that are achieved with PET bottles laced with polyamide. The PET bottles, which contain PET recyclate and aliphatic furanoates, can be recycled in contrast to PET bottles laced with polyamide because they yellow much less than the polyamide. Accordingly, it is possible by means of the present invention to add PET bottles with barrier to the recycling flow.

The mixture for producing the PET bottle contains more than 50 wt % of PET recyclate or between 4 and 40 wt % of aliphatic furanoates. If the PET recyclate and the aliphatic furanoate do not add up to 100 wt %, the mixture may additionally contain virgin PET, thus non-recycled PET.

By adding an aliphatic furanoate to the mixture, the PET bottle has a very good b and L value. A b value of less than 5 and an L value greater than 76 can be achieved. These specifications show that the yellow tinge and the amount of darkness are in areas that are acceptable for PET bottles and do not additionally yellow and cloud the recycling stream.

During the injection molding of the preform, which is stretch-blown to produce the PET bottle, the mixture of PET recyclate and aliphatic furanoate is loaded under 300° C. and with a dwell time in the injection molding machine of less than 100 seconds. This reduces the strain on the mixture, which leads to thermal decomposition reactions and an associated high yellowing. The thermal degradation reactions can also be reduced by drying the mixture of PET recyclate and aliphatic furanoate at a temperature above 155° C. prior to processing in the injection molding machine. As a result, shear forces and the thermal degradation in the injection molding machine are also kept as small as possible. An addition of phosphoric acid to the mixture also causes a reduction in thermal degradation.

If the wall thickness of the preform is more than 2 mm, the PET homopolymer tends to have a strong crystallization. The crystallized preform would thus not be able to be blown at all. Therefore, up to 3 wt % of diethylene glycol and up to 6 wt % of isophthalic acid are usually added to the PET. This inhibits crystal formation.

The present PET bottle contains less than 1 wt % of isophthalic acid, because the aliphatic furanoate acts as a crystallization inhibitor due to its excellent copolymerizing properties with PET.

The invention claimed is:

1. A preform for producing a plastic container in a blow molding process, comprising:
an elongated, preform body, which is formed so as to be closed at the one longitudinal end thereof, and, at the other end thereof, has a neck section having a pouring opening, the preform body comprised of recycled PET and aliphatic furanoate, wherein the recycled PET has a maximum of 2.5 percent by weight of a mixture of isophthalic acid and diethylene glycol, wherein either the isophthalic acid or the diethylene glycol of the mixture comprises at most 2.0 percent by weight of the recycled PET, wherein all percentages by weight are based on a total weight of the preform body, and wherein a clouding of the preform body measured according to ASTM D 1003-00 by admixture of the aliphatic furanoate is less than 5%.

2. The preform of claim 1, wherein the admixture of the aliphatic furanoate is between 4% and 40% by weight based on the total weight of the preform body.

3. The preform of claim 1, wherein the preform body has a wall thickness that is between 3 mm and 10 mm.

4. The preform of claim 1, wherein the preform body is configured to form a reusable container.

5. A PET barrier bottle, comprising:
an elongated body that is closed at the one longitudinal end thereof, and, at the other end thereof, has a neck section having a pouring opening, the body comprised of recycled PET and aliphatic furanoate, wherein the recycled PET has a maximum of 2.5 percent by weight of a mixture of isophthalic acid and diethylene glycol, wherein either the isophthalic acid or the diethylene glycol of the mixture comprises at most 2.0 percent by weight of the recycled PET, wherein all percentages by weight are based on a total weight of the preform body, wherein a clouding of the preform body measured according to ASTM D 1003-00 by admixture of the aliphatic furanoate is less than 5%, and wherein the aliphatic furanoate has a b value less than 5 and an L value greater than 76 from a CIELAB color space.

6. The PET barrier bottle of claim 5, wherein the body has a wall thickness that it is suitable for refilling or as a reusable bottle.

7. The PET barrier bottle of claim 6, wherein the body has a wall thickness that is between 3 mm and 10 mm.

8. The PET barrier bottle of claim 5, wherein the admixture of the aliphatic furanoate is between 4% and 40% by weight based on the total weight of the preform body.

9. The PET barrier bottle of claim 5, wherein the body is configured to form a reusable PET barrier bottle.

10. A method of producing a preform, comprising:
providing a mixture of plastic granules; and
producing a preform from the mixture of plastic granules by injection molding, the mixture of plastic granules comprised of recycled PET and an aliphatic furanoate of less than 5.0 percent by weight, wherein the recycled PET has a maximum of 2.5 percent by weight of a mixture of isophthalic acid and diethylene glycol, wherein either the isophthalic acid or the diethylene glycol of the mixture comprises at most 2.0 percent by weight of the recycled PET, wherein all percentages by weight are based on a total weight of the preform, and wherein a haze of the preform is measured according to ASTM D 1003-00.

11. The method of claim 10, wherein the aliphatic furanoate is between 4% and 40% by weight based on the total weight of the preform.

12. The method of claim 10, wherein the mixture is used to form a preform.

13. The method of claim 12, wherein the preform is used to form a reusable PET barrier bottle.

14. A mixture of recycled PET and aliphatic furanoate for forming a preform, comprising:
recycled PET having a maximum of 2.5 percent by weight of a mixture of isophthalic acid and diethylene glycol, wherein either the isophthalic acid or the diethylene glycol of the mixture comprises at most 2.0 percent by weight of the recycled PET, and wherein all percentages by weight are based on a total weight of the mixture.

15. The mixture of claim 14, wherein a proportion of the aliphatic furanoate is between 4% and 40% by weight based on the total weight of the mixture.

16. The mixture of claim 14, wherein the mixture is combined to form a preform.

17. The mixture of claim 16, wherein the preform is used to form a reusable PET barrier bottle.

* * * * *